(12) United States Patent
Hiraga et al.

(10) Patent No.: US 7,009,606 B2
(45) Date of Patent: Mar. 7, 2006

(54) METHOD AND APPARATUS FOR GENERATING PSEUDO-THREE-DIMENSIONAL IMAGES

(75) Inventors: Masaki Hiraga, Tokyo (JP); Kensuke Habuka, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 369 days.

(21) Appl. No.: 10/386,547

(22) Filed: Mar. 13, 2003

(65) Prior Publication Data

US 2004/0004615 A1 Jan. 8, 2004

Related U.S. Application Data

(63) Continuation of application No. PCT/JP01/07807, filed on Sep. 7, 2001, now abandoned.

(30) Foreign Application Priority Data

Sep. 13, 2000 (JP) .............................. 2000-277530
Aug. 9, 2001 (JP) .............................. 2001-242282

(51) Int. Cl.
*G06T 15/00* (2006.01)
(52) U.S. Cl. ...................... 345/421; 348/402; 375/240
(58) Field of Classification Search ................ 345/419, 345/420, 421, 422, 473, 474, 475; 375/240, 375/240.02, 240.03; 348/402, 699
See application file for complete search history.

(56) References Cited

U.S. PATENT DOCUMENTS

| 5,742,289 A | | 4/1998 | Naylor et al. ................ 345/419 |
| 5,969,772 A | * | 10/1999 | Saeki ......................... 348/699 |
| 6,414,685 B1 | * | 7/2002 | Takakura et al. ............ 345/473 |
| 6,834,081 B1 | * | 12/2004 | Kim et al. ............. 375/240.03 |

OTHER PUBLICATIONS

International Search Report for International Patent Application No. PCT/JP01/07807, ISA: Japanese Patent Office, Dec. 13, 2001.

\* cited by examiner

*Primary Examiner*—Phu K. Nguyen

(57) ABSTRACT

Provided is a pseudo-three-dimensional image generating technique by which a further increased large amount of CG images is generated and drawn. A pseudo-three-dimensional image generating apparatus includes a first processing unit and a second processing unit. When moving pictures that contain a three-dimensional object model are generated, the first processing unit generates key frames, selected at certain or varied intervals, of the moving pictures by CG. The second processing unit interpolates these key frames by an image processing, so as to generate intermediate frames. The timing of the key frames and intermediate frames are adjusted in a buffer memory and are then outputted to a display apparatus.

39 Claims, 11 Drawing Sheets

METHOD AND APPARATUS FOR GENERATING PSEUDO-THREE-DIMENSIONAL IMAGES

This application is a continuation of international application number PCT/JP01/07807, filed Sep. 7, 2001, and now abandoned.

FIELD OF THE INVENTION

The present invention relates to pseudo-three-dimensional image generating techniques. It particularly relates to method and apparatus for generating a pseudo-three-dimensional image where a three-dimensional object model is drawn.

DESCRIPTION OF THE RELATED ART

Conventionally, the CG (computer graphics) technology, together with SFX and such other techniques, has been used mainly in SF movies. In Hollywood movies today, for instance, CG images are used in certain scenes of a large number of them irrespective of their genre. Also, the software of various games enjoyed at home cannot show their worth without CG technology, and CG has penetrated deeply into not only children's but also adults' daily lives. Recently efforts are being made to structure home network systems using the hardware, which have come into wide use at home as game machines, as its core, and it is certain that such CG-based user interfaces will become a familiar feature in our daily scenes.

As the use of CG spreads, there arise growing demands for more detailed and realistic images. In the case of the above-mentioned game machines, the drawing speed of the core CPU has already achieved the order of million polygons per second. Though it may be mere game machines, the growth of their CPU power is remarkable.

The dilemma of CG suppliers lies in the fact that once fine and detailed images are shown, the users take them for granted and escalate their demands gradually. Even the above-mentioned speed on the order of million polygons per second is not enough for the users who have gotten accustomed to the amazing images of CG movies. By the time a newly developed CPU is put on the market, the user demand is already ahead of it. And this is repeated endlessly.

SUMMARY OF THE INVENTION

The present invention has been made in view of foregoing circumstances and, therefore, an object of the present invention is to provide a technology capable of generating and drawing a larger amount of CG images at relatively light computation load.

A preferred embodiment according to the present invention relates to a pseudo-three-dimensional image generating method. This method includes: assigning a point of interest to a first CG image that contains a three-dimensional object model; and computing a corresponding point that corresponds to the point of interest in a second CG image that contains the three-dimensional object model, wherein the computing derives the corresponding point in such a manner that image coordinates of the point of interest serve as processing starting information. The computing may be such that the corresponding point that corresponds to the point of interest is calculated by referring to the three-dimensional object model.

For example, when an operation by which the three-dimensional object model is operated inside a three-dimensional space in order to obtain an i-th CG image (i being a natural number) is denoted by $M_i$, an operation to obtain the i-th CG image by projecting the three-dimensional object model onto a two-dimensional plane after the operation $M_i$ has been performed is denoted by $Q_i$, the point of interest is denoted by p and the corresponding point is denoted by p', the computing may be such that $$p' = Q_2 M_2 M_1^{-1} Q_1^{-1} p \qquad \text{(Equation 1)}$$

is calculated so as to derive the point of interest. Since the operation $M_i$ is expressed here as an absolute operation, the operation is of a fixed form for each or each set of the images. However, an operation to be added to the three-dimensional object model in the three-dimensional space, in the event of moving from the i-th CG image toward the (i+1)-th CG image, may of course be expressed in the form of a relative operation such as $M_{i,i+1}$. Since both operations are essentially the same, the absolute expression which is simpler in notation will be used throughout.

This method may further include generating an intermediate image of the firs CG image and the second CG image by interpolating image positions of the point of interest and the corresponding point.

Normally, when three-dimensional CG images are to be generated, an arbitrary three-dimensional coordinate transformation in the three-dimensional space, that is, the above-described $M_i$, is first performed on a three-dimensional object model (hereinafter also referred to as "object") and thereafter a view volume defined by a predetermined viewpoint is projected onto the plane, that is, the above-described Qi is performed so as to obtain images. An example of the $M_i$ is an affine transformation including rotation, translation, dilation and contraction. If the object is expressed by polygon, $$Q_i M_i s$$

is computed for each of vertices of the polygon. In the case of moving pictures, a similar processing is repeated for each of image frames, so that the computation load to draw each frame becomes heavy if the number of polygon is large. Thus, the degree of attainable fineness of an image that can be drawn in real time is limited.

According to the present invention, on the other hand, when the number of frames to be drawn in a second is, for example, 30 and those image frames are denoted by $I_i$ (i=1, 2, . . . , 30), $I_1$ and $I_{30}$ are rendered by the conventional method and these $I_1$ and $I_{30}$ are regarded as the first CG image and the second DG image, respectively. Then a corresponding point, in $I_{30}$, of a point of interest set in $I_1$ is computed, and matching between the two images is computed by repeating this processing for a plurality of points of interest, so that intermediate frames $I_2$ through $I_{29}$ can be virtually generated by interpolating the positional relations between those points of interest and the corresponding points. Therefore, if the conventional rendering is to be done in this case, the rendering needs to be performed on only two frames out of 30 frames. Thus, even taking the computation by the equation 1 necessary for computing the corresponding points into consideration, the total computation load can be significantly reduced. Hereinafter, the image frames which are rendered by a method similar to the conventional method, or more generally, the image frames on which the interpolation will be based will be called "key frames."

There may exist a single or plural invisible region(s) due to occlusion, in the CG image where a plurality of objects are drawn. The computing a corresponding point may include determining occlusion. If it is determined that the corresponding point is invisible in the second CG image due to occlusion, data indicating that there does not exist a point on the second CG image to be corresponded to the point of interest may be outputted, or the corresponding point may be corresponded to the point of interest on the assumption that the corresponding point virtually exists on the second CG image.

What is meant by "virtually exists" includes a case when an image corresponding to an invisible region is virtually generated in a manner such that an image of an occlusion region is generated from the original three-dimensional object model and is then pasted on the second CG image, or such that an image corresponding to the occlusion region is cut out and pasted on the second CG image.

In order to cope with a problem of occlusion, a CG image may be given a layered structure in a depth direction. The CG image having this layered structure may be an image such that a plurality of images, whose depths in the depth direction with an object being viewed from a single viewpoint differ, are multiplexed. The method according to this embodiment may further include determining occlusion in the second CG image, wherein the computing a corresponding point may be such that the three-dimensional object model is divided into layers according to depth, and the corresponding point that corresponds to the point of interest is computed for each of the layers if it is determined that there exists a visible region in the first CG image while there exists an invisible region in the second CG image due to occlusion.

This method may further include generating an intermediate image of the first CG image and the second CG image for each of the layers by interpolating image positions of the point of interest and the corresponding point, and synthesizing the intermediate image generated for each of the layers by taking overlap in a depth direction into account.

Another preferred embodiment according to the present invention relates also to a pseudo-three-dimensional image generating method. This method includes: assigning a point of interest to a three-dimensional object model; computing a first corresponding point which corresponds to the point of interest in a first CG image that contains the three-dimensional object model; computing a second corresponding point which corresponds to the point of interest in a second CG image that contains the three-dimensional object model; and recording the first corresponding point and the second corresponding point in an associated manner.

When an operation by which the three-dimensional object model is operated inside a three-dimensional space in order to obtain an i-th CG image (i being a natural number) is denoted by $M_i$, an operation to obtain the i-th CG image by projecting the three-dimensional object model onto a two-dimensional plane after the operation $M_i$ has been performed is denoted by $Q_i$, the point of interest is denoted by p and the corresponding point is denoted by p', the computing a first corresponding point may be such that $p_1=Q_1M_1p$ is calculated, and the computing a second corresponding point may be such that $p_2=Q_2M_2p$ is calculated, and the recording may be such that at least a pair of data item, $(p_1, p_2)$, are recorded.

Utilizing, for example, the pair of the data item, the method may further include generating an intermediate image of the first CG image and the second CG image by interpolating image positions of the first corresponding point and the second corresponding point. In this embodiment, too, the key frames are suppressed to part of the whole frames, so that computation load can be markedly reduced.

A method according to this embodiment may further include judging the presence of occlusion in the first and second CG images, wherein the computing a corresponding point may be such that the three-dimensional object model is divided into layers according to depth, and the first corresponding point and the second corresponding point that correspond to the point of interest are computed layer by layer if it is judged that there exists an invisible region in at least one of the first and second CG images due to occlusion.

This method may further include generating an intermediate image of the firs CG image and the second CG image for each of the layers by interpolating image positions of the first corresponding point and the second corresponding point, and synthesizing the intermediate image generated for each of the layers by taking overlap in a depth direction into account.

Still another preferred embodiment according to the present invention relates also to a pseudo-three-dimensional image generating method. This method includes: assigning a point of interest to a first CG image that contains a three-dimensional object model; and computing a corresponding point that corresponds to the point of interest in a second CG image that contains the three-dimensional object model. The computing may be such that an image coordinate of the point of interest is utilized as processing starting information, the first CG image and the second CG mage are respectively divided into layers according to depth, and the corresponding point is derived by taking the layer, to which the point of interest and the corresponding point belong, into account as a condition. The computing may be such that the corresponding point that corresponds to the point of interest is computed on condition that both the point of interest and the corresponding point belong to a same layer.

Still another preferred embodiment according to the present invention relates also a pseudo-three-dimensional image generating method. This method includes: assigning a point of interest to an object model; computing a first corresponding point that corresponds to the point of interest in a first CG image that contains the three-dimensional object model; computing a second corresponding point that corresponds to the point of interest in a second CG image that contains the three-dimensional object model; and recoding the first corresponding point and the second corresponding point in an associated manner. The recording in an associated manner may be such that the first CG image and the second CG mage are respectively divided into layers according to depth, and the first corresponding point is associated with the second corresponding point based on a condition of a layer or layers that the first corresponding point and the second corresponding point belong to. The recording may be such that the first corresponding point and the second corresponding point are recorded in an associated manner on condition that both the first corresponding point and the second corresponding point belong to a same layer.

Still another preferred embodiment according to the present invention relates also a pseudo-three-dimensional image generating method. This method includes: acquiring a first image and a second image which have depth information; and specifying a conversion rule of an image coordinate of an object contained in the first image and the second image. The specifying is such that, upon acquiring information on how to operate the object in a three dimensional space, for example, information on the above-described $M_i$, the conversion rule is obtained by taking that information into account.

The specifying may be such that the conversion rule is obtained, for example, in the form of $Q_iM_i$, by combining information in the three dimensional space, such as $M_i$, and information on an operation, such as $Q_i$, by which the object is projected from the three dimensional space onto image planes of the first image and the second image.

This embodiment may further include: computing a corresponding point in the second image that corresponds to a point of interest provided in the first image, based on the conversion rule; and generating an intermediate image of the first image and the second image by interpolating image positions of the point of interest and the corresponding point.

Here, the first and second images include photographed images obtained by a stereo camera or the other devices that can acquire depth information. If not for CG images, the concept of the rendering is not required. However, here too, the first and second images are the key frames utilized to generate intermediate images. In this embodiment, too, the corresponding points are obtained through the manipulation of the object in the three-dimensional space, so that they are generally grasped with high accuracy. As a result thereof, relatively reliable and accurate intermediate images can be obtained from a small amount of key frames, thus realizing a desirable data compression.

Still another preferred embodiment according to the present invention relates also a pseudo-three-dimensional image generating method. This method renders, by CG, moving pictures that contain a three-dimensional object model, and executes a first rendering and a second rendering in a combined manner. The first rendering draws key frames selected from a plurality of image frames that constitute the moving pictures by using a direct method that copes with description of the three-dimensional object model, the second rendering draws intermediate frames by interpolating the key frames, and the moving pictures are expressed by the key frames and the intermediate frames.

For example, if the object is described by a polygon, the first rendering is such that executed is a general rendering that draws the polygon. Though there are other various expressions such as a function or volume besides the polygon, the first rendering is such that the key frames are rendered by a method applied naturally to those expressions. On the other hand, the second rendering is such that the intermediate frames are generated or drawn by performing interpolation on among the key frames.

Still another preferred embodiment according to the present invention relates to a pseudo-three-dimensional image generating apparatus. This apparatus, which renders, by CG, moving pictures that contain a three-dimensional object model, includes: a first processing unit which draws key frames selected from a plurality of image frames that constitute the moving pictures, by using a direct method that copes with description of the three-dimensional object model; and a second processing unit which generates intermediate images by interpolating the key frames.

The processing unit may include: a point-of-interest setting unit which assigns a point of interest to a first key frame that contains the three-dimensional object model; and a corresponding-point computing unit which computes a corresponding point that corresponds to the point of interest in a second key frame that contains the three-dimensional object model, in such a manner that image coordinates of the point of interest serve as processing starting information, wherein the intermediate frame may be generated based on a positional relation between the point of interest and the corresponding point. The corresponding-point computing unit may divide the three-dimensional object model into layers according to depth, and may compute the corresponding point that corresponds to the point of interest layer by layer. The corresponding-point computing unit may respectively divide the first and second key frames into layers according to depth, and may compute the corresponding point based on a condition of a layer or layers that the first corresponding point and the second corresponding point belong to.

The second processing unit further includes an occlusion determining unit which judges the presence of occlusion in the second key frame, and the corresponding-point computing unit may divide the three-dimensional object model into layers according to depth and may compute the corresponding point that corresponds to the point of interest layer by layer if it is determined that there exists a visible region in the first key frame while there exists an invisible region in the second key frame due to occlusion. Moreover, during a process in which the corresponding-point computing unit computes the corresponding point, the occlusion determining unit judges whether the corresponding point lies in the occlusion region or not. If it is judged by the occlusion determining unit that the corresponding point exists in the occlusion region, the corresponding-point computing unit may set layer information to the correspondence relation between the point of interest and the corresponding point. The second processing unit may generate the intermediate frame, for each of the layers, based on a positional relation between the point of interest and the corresponding point and may synthesizes the intermediate frame generated for each of the layers by taking overlap in a depth direction into account.

As another structure, the second processing unit may include: a point-of-interest setting unit which assigns a point of interest to the three-dimensional object model; a corresponding-point computing unit which computes a first corresponding point that corresponds to the point of interest in a first key frame that contains the three-dimensional object model, and computes a second corresponding point that corresponds to the point of interest in a second key frame that contains the three-dimensional object model; and a recording unit which records the first corresponding point and the second corresponding point in an associated manner, wherein the second processing unit may generate the intermediate frame based on a positional relation between the first corresponding point and the second corresponding point.

Still another preferred embodiment according to the present invention relates to a pseudo-three-dimensional image generating method. This method is a method by which to generate moving pictures that contain a three-dimensional object model, and includes: selecting predetermined frames as, key frames among image frames constituting the moving pictures; turning the key frames into a CG image by utilizing three-dimensional information on the three-dimensional object model; and generating an intermediate frame which should exist between the key frames by computing image matching among the key frames.

It is to be noted that any arbitrary combination of the above-described elements and their expressions changed between a method, an apparatus, a recording medium, computer program and so forth are also encompassed by the scope of the present invention.

BRIEF DESCRIPTION OF THE DRAWINGS

The above-described objects and the other objects, features and advantages will become more apparent from the following preferred embodiments taken with the accompanying drawings in which.

DETAILED DESCRIPTION OF THE INVENTION

One of the features of an embodiment is a fusion of CG technology and natural picture processing technology. According to a general technique of CG, a three-dimensional object model (hereinafter referred to as "object") can be turned into a CG image if a three-dimensional form of the object and the posture thereof in a three-dimensional space are specified and an image plane onto which it is to be projected is determined. With moving pictures, too, the motion of an object can be expressed completely by performing the above-described process on each of the frames. However, computation load to express a multiplicity of polygons in real time is heavy.

On the other hand, as an image processing mainly for natural pictures, a technique has been conventionally known in which matching between two images is computed and an intermediate image is obtained by interpolating the corresponding points. Although image matching is generally applied to the structuring of three-dimensional data from an image or the image recognition, it can also be utilized effectively in the compression of moving pictures by generating intermediate images through interpolation. Nevertheless, matching can involve incorrect correspondence, and the intermediate images produced often have problems with the image quality.

The present embodiment fuses together the advantages of CG and the advantages of image matching and lightens the shortcomings thereof. In CG, the position of an object in each frame is identified perfectly, so that there is normally no room for such a "hazy" concept as interpolation to enter. Image matching, on the other hand, is applicable only to natural pictures or photographed images and is basically incompatible with the artificial concept of CG.

Despite these preconditions, the present embodiment is such that key frames only are turned into images using the three-dimensional information on an object, and intermediate frames are generated by image matching. Utilized is the understanding of the present inventors that the information on the coordinates within the image of an object drawn in a key frame rendered by CG is perfectly defined in a process of CG processing and therefore a corresponding point in a second key frame that corresponds to a point of interest set in a first key frame can be specified perfectly. That is, as matching between key frames can be obtained without error, the image quality of intermediate frames obtained by interpolation becomes very high. At the same time, computation load becomes light because the rendering of intermediate frames can be accomplished by interpolation computation only.

Figure 1:
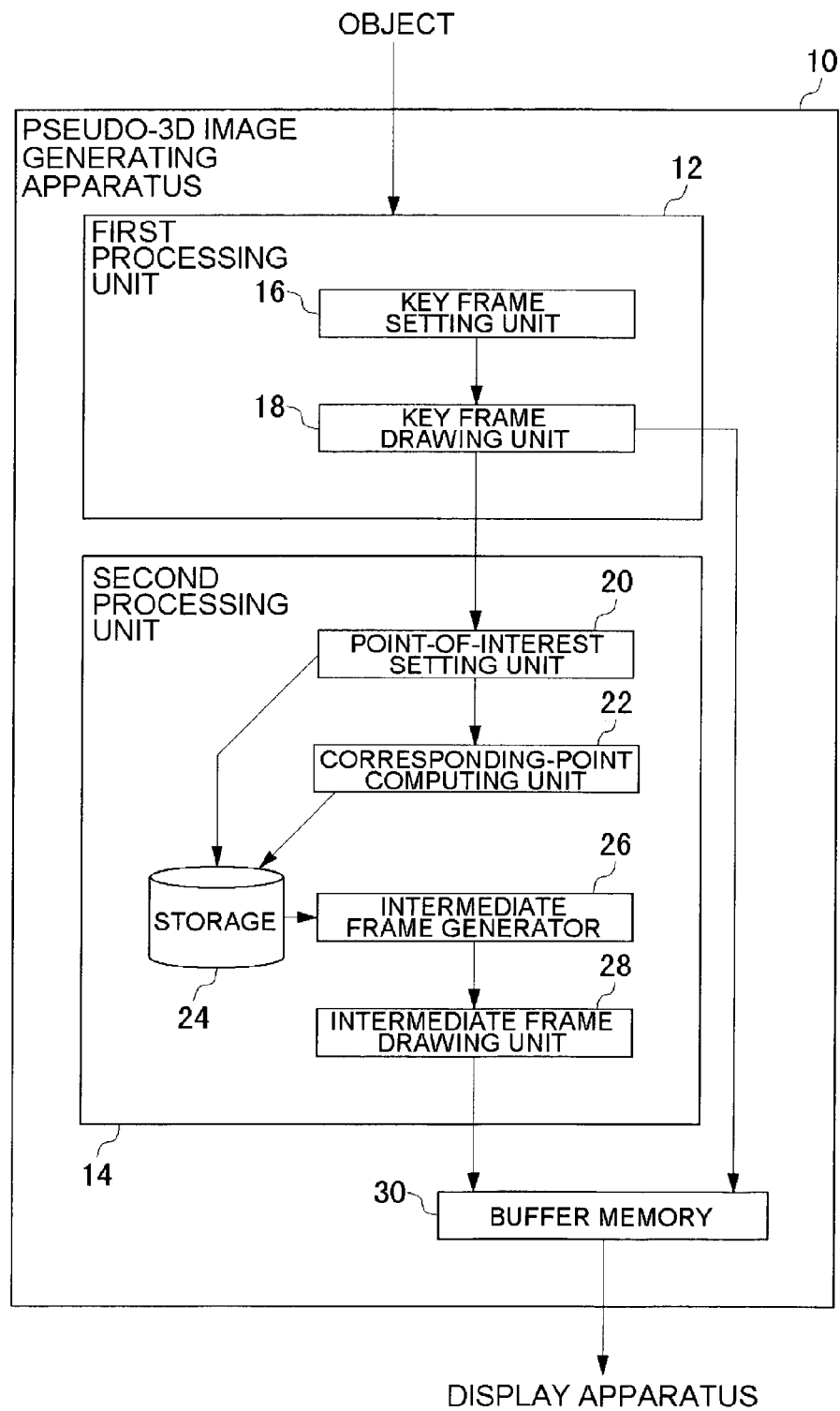
FIG. 1 shows a structure of a pseudo-three-dimensional image generating apparatus according to a first embodiment.

FIG. 1 shows a structure of a pseudo-three-dimensional image generating apparatus 10 according to a first embodiment. In terms of hardware, this structure can be realized by a CPU, a memory and other LSIs of an arbitrary computer. In terms of software, it is realized by memory-loaded programs or the like having a function of generating pseudo-three-dimensional images, but drawn and described here are functional blocks that are realized in cooperation with those. Thus, it is understood by the skilled in the art that these functional blocks can be realized in a variety of forms by hardware only, software only or the combination thereof.

The pseudo-three-dimensional image generating apparatus 10 includes a first processing unit 12, a second processing unit 14, and a buffer memory 30 that stores those outputs temporarily and performs a synchronization processing on them. The first processing unit 12 includes a key frame setting unit 16 that sets key frames when drawing an object as moving pictures, and a key frame drawing unit 18 that actually renders the set key frames by a CG processing. Now, suppose that two key frames, namely, first and second key frames, are to be drawn.

The second processing unit 14 includes a point-of-interest setting unit 20 that sets a point of interest relative to the first key frame, a corresponding-point computing unit 22 that computes a corresponding point in the second key frame that corresponds to the point of interest, a recording unit 24 that stores the point-of-interest point and the corresponding point in a manner that associates them, an intermediate frame generator 26 that generates intermediate frames by computing an interpolation based on the associated information, and an intermediate frame drawing unit 28 that renders the generated intermediate frames. The rendered key frames and intermediate frames are stored in a buffer memory 30 once, aligned into a correct sequence of frames and outputted to a display apparatus (not shown).

Figure 2:
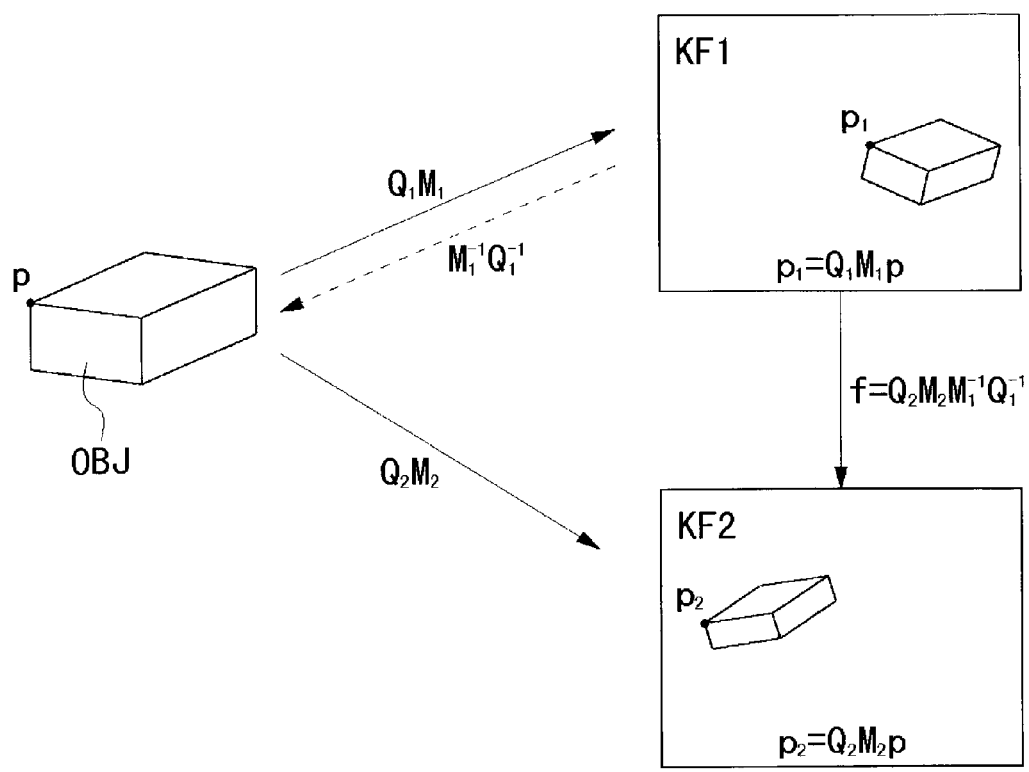
FIG. 2 is a schematic illustration showing operations for drawing an object in a first key frame and a second key frame.

FIG. 2 shows an outline of coordinate computation for drawing an object OBJ, which is described by three-dimensional coordinate data, in each of a first key frame KF1 and a second key frame KF2. Here, the following notation is used:

$M_i$: Operation from three dimensions to two dimensions, wherein an object OBJ is manipulated within a three-dimensional space, in order to obtain an i-th key frame.

$Q_i$: Operation from three dimensions to three dimensions to obtain the i-th key frame by projecting the object OBJ onto a two-dimensional plane, after the operation $M_i$.

$p_1$: A point of interest set in the first key frame KF1.

$p_2$: A corresponding point that corresponds to $p_1$ obtained in the second key frame KF2.

p: A point on the original object OBJ corresponding to $p_1$ and $p_2$.

If $M_i$ is a manipulation in a world coordinate system, then $Q_i$ may be understood as a conversion of it into the coordinate system within a camera image plane. The former may also be expressed as a model view matrix, and the latter as a projection matrix. Although the latter has been stated to be a conversion from three dimensions to two dimensions, the CG processing is generally such that in addition to two-dimensional coordinates (x, y) on the screen, there remain the depths d of their respective points as attributes. Namely, data on each of the points on the screen are stored in the form of $(x_a, y_a, d_a)$.

According to this notation, the equation by which to derive $p_2$ from $p_1$ is:

$$P_2 = fp_1 = Q_2 M_2 M_1^{-1} Q_1^{-1} p_1 \quad \text{(Equation 2)}$$

Here, an operation f can be said to specify the conversion rule for the coordinates within an image of the object OBJ between the first key frame KF1 and the second key frame KF2.

Figure 3:
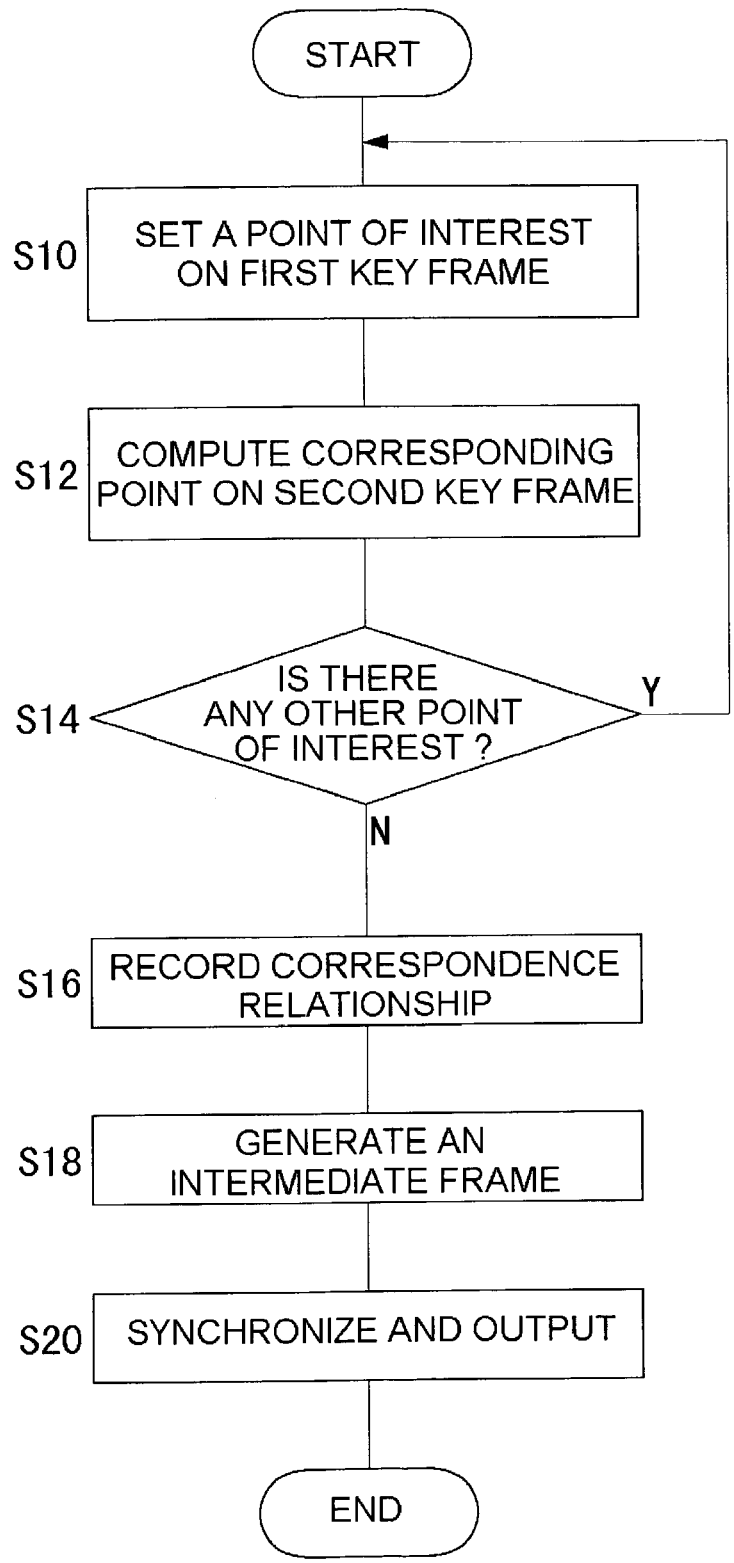
FIG. 3 is a flowchart showing a procedure for generating a pseudo-three-dimensional image according to the first embodiment.

FIG. 3 is a flowchart showing a processing done by the pseudo-three-dimensional image generating apparatus 10. The concept underlying here is that the starting point of processing is the first key frame KF1 and a point of interest is set on the image. The case where the point of interest is placed on an object OBJ will be described later with reference to FIG. 5.

Prior to the start of the processing in FIG. 3, key frames are set for the moving pictures to be generated by the key frame setting unit 16. It is supposed here that 30 image frames are to be generated, and the key frame setting unit 16, for instance, sets the first frame thereof as a first key frame KF1 and the last frame thereof as a second key frame KF2. Key frames can be selected in various ways, automatically or manually, that is, the key frames can be placed or selected at every predetermined number of frames or whenever a scene change takes place, or frames specified by a user may be selected as key frames.

In a similar manner, it is supposed that prior to the processing of FIG. 3, selected key frames have already been subjected to a rendering by a key frame rendering unit 18, using a conventionally general CG processing, and the resulting drawing data are stored in the buffer memory 30.

Under these assumptions, as shown in FIG. 3, the point-of-interest setting unit 20 first sets a point of interest on the first key frame KF1 (S10). The point of interest may be set at the vertex or the like of a polygon, may be set one for each polygon, or may be set at fixed intervals in the x and y direction on the first key frame KF1. The greater the number of points of interest, the finer the result will be, but the number thereof should be chosen in consideration of computation load.

Then a corresponding point on the second key frame KF2 corresponding to the above-mentioned point of interest is computed by the corresponding-point computing unit 22 (S12). If one point of interest is $p_1$ as in FIG. 2, the corresponding point $p_2$ thereof is derived using the above-described equation 2.

Corresponding points are computed for all the points of interest initially set (Y of S14). Upon completion thereof (N of S14), the correspondence relationship, namely, all the pairs of $(p_1, p_2)$, is recorded as coordinate data in the recording unit 24 (S16). Moreover, at this time, arbitrary attribute data other than coordinates, which these points have, may be converted into numerical values and stored. The attribute data converted into numerical values can be subjected to an interpolation processing later. Colors are taken as an example here. That is, color data $c_1$ for $p_1$ and color data $c_2$ for $p_2$ are stored.

Then the intermediate frame generator 26 generates intermediate frames by performing an interpolation computation based on the stored correspondence relations (S18), and an intermediate frame drawing unit 28 renders the generated intermediate frames and outputs the resulting data to the buffer memory 30.

Figure 4:
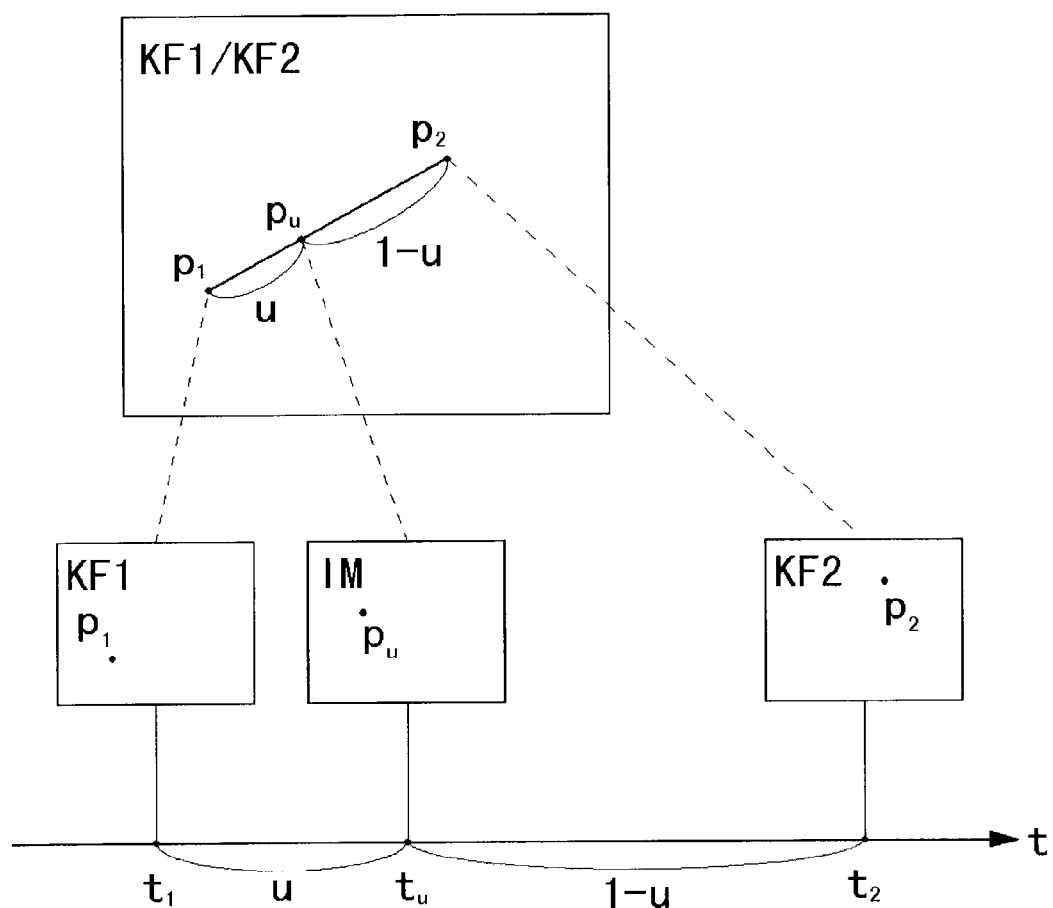
FIG. 4 shows conceptually a processing for generating an intermediate frame by interpolation.

FIG. 4 shows an interpolation processing. Here, a first key frame KF1 and a second key frame KF2, which are superposed on each other, are shown in the top of the figure, and the positional relationship between the point-of-interest $p_1$ and the corresponding point $p_2$ is shown clearly. Although an arbitrary nonlinear interpolation may be used for interpolation, a linear interpolation or a linear homotopy is used here for the sake of simplicity. The point-of-interest $p_1$ and the corresponding point $p_2$ are connected by a line segment, which is interior-divided at a ratio of u:(1−u). If the display times for the first key frame KF1 and the second key frame KF2 are denoted by $t_1$ and $t_2$, respectively, then the intermediate frame IM at display time $t_u = ut_2 + (1-u)t_1$ can be obtained by the above-mentioned interior division. Strictly speaking, the position of a corresponding point on the intermediate frame IM corresponding to the point p on the object OBJ is obtained. The intermediate frame IM is completed by performing this interior division processing for all the pairs of point-of-interest and corresponding point.

Since an intermediate frame at arbitrary time between the first key frame KF1 and the second key frame KF2 can be generated by repeating the above-described processing by moving the above-mentioned parameter u in the range of [0, 1], a finite number of intermediate frames are generally obtained by moving u stepwise in [0, 1]. At this time, the color is also interpolated to obtain smooth moving pictures, using $$C_u = uc_2 + (1-u)c_1 \quad \text{(Equation 3)}$$

The equation 3 is also valid for attributes other than position and color. It is to be noted that if u is allowed to take values other than [0, 1], exterior division, instead of internal division, may be realized. That is, frames before the first key frame KF1 or frames after the second key frame KF2 can be generated. Such frames are also called intermediate frames.

In the buffer memory 30, rendering data of key frames and rendering data of intermediate frames are stored at the point of completion of S18. These are rearranged in the order of frames, synchronized at predetermined output timing, and outputted to the display apparatus (S20). Thus completes a series of processing.

Figure 5:
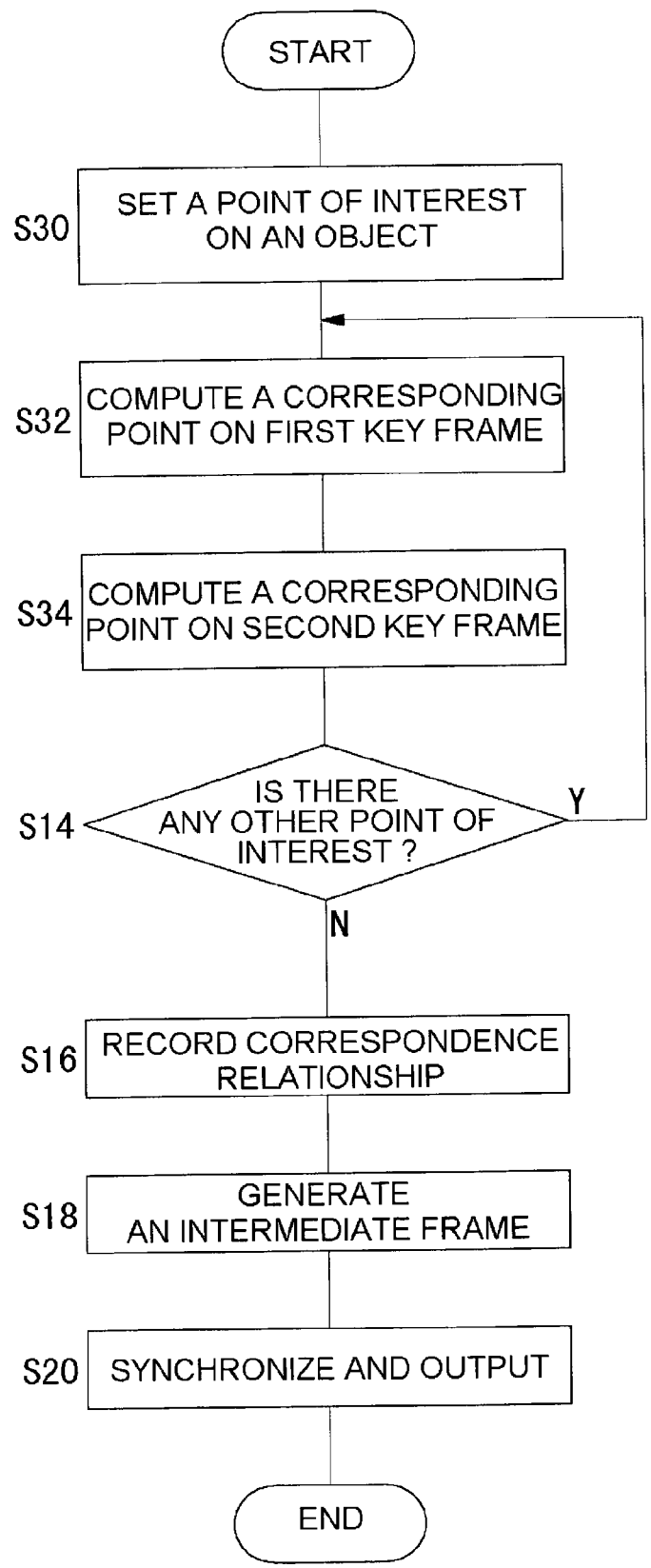
FIG. 5 is a flowchart showing a procedure, according to the first embodiment, for generating a pseudo-three-dimensional image from a processing starting point different from that shown in FIG. 3.

FIG. 5 is a flowchart showing another type of processing done by the pseudo-three-dimensional image generating apparatus 10. Although, in FIG. 3, the first key frame KF1 is the starting point of processing, the object OBJ is the starting point of processing here. The processing starts with the setting of a point-of-interest p on the object OBJ by the point-of-interest setting unit 20 (S30). The processings by the key frame setting unit 16 and the key frame drawing unit 18 are the same as those in FIG. 3. Then the corresponding points are computed for the first key frame KF1 and the second key frame KF2, respectively (S32, S34). The former is called a first corresponding point $p_1$, and the latter a second corresponding point $p_2$. They can be derived by $$P_1 = Q_1 M_1 p$$

$$P_2 = Q_2 M_2 p$$

Hereafter the first corresponding points and the second corresponding points are computed until all the points of interest having been set on the object OBJ are gone (S14). Once the correspondence relationship is grasped, the subsequent steps of processing S16 to S20 are the same as in FIG. 3.

In the first embodiment described above, key frames in consideration have been CG images. However, the present invention is applicable to other types of images as well. A good example thereof is images in general that have depth information. The reason is that the equations for operation used in the processings described thus far can generally be applied to image data which have not only the two-dimensional coordinates of x and y but also depth information d. Hence, similar intermediate images can be generated for images obtained by stereo cameras or infrared or other range sensors and for ordinary two-dimensional images to which depth information is artificially added. The depth information may be held not only in pixel units but also in units of area formed by a certain set of pixels. Moreover, while the generation of moving pictures has been described in the above embodiment, still pictures with images from different viewpoints than the key frame can be obtained.

Concerning the interpretation of the embodiments, a number of notes will be added hereinbelow. The parts stating that key frames are obtained by rendering by a conventional method have two meanings. That is, one of them means that key frames are rendered by a conventional method at the time of drawing thereof, and the other means that images having been rendered by a conventional method are stored as key frames and then the images thereof are displayed. The present patent specifications employ statements like "rendering key frames by the conventional method" for both cases.

The interior division at a ratio of u:(1−u) is used in generating an intermediate frame. In doing so, however, it is not necessary that the interior division is done in a linear manner or that the interpolation is such that the sum is always 1 (one).

Next, a second embodiment according to the present invention will be described. The second embodiment differs from the first embodiment in that an intermediate frame is generated by obtaining the correspondence relationship between key frames while taking into account the problem of occlusion, in which an object hidden behind the other object is not visible. The description of the structure and operation that are in common with the first embodiment will be omitted, and the structure and operation that differ from the first embodiment will be explained hereinafter.

Generally when there is an occlusion, the generation of an intermediate image by forcibly deriving a correspondence relationship between key frames will result in a forcible correspondence to a false corresponding point despite the fact that there actually is no corresponding point in the region of occlusion, thus producing an unnatural intermediate image. Therefore, in this second embodiment, the image of an object is given a layer structure in a depth direction and the correspondence relationship is computed layer by layer. In generating intermediate frames, an intermediate frame is generated for each layer and a final intermediate frame is generated by synthesizing the intermediate frames for the respective layers while taking their overlap in the depth direction into account.

In this second embodiment, as with the first embodiment, a three-dimensional model of an object can be utilized, so that it is possible to identify in the key frame the region where an occlusion is taking place and to divide the region of occlusion into layers in the depth direction. For the region in the key frame where no occlusion is taking place, an intermediate frame can be generated by the method described in the first embodiment without dividing into layers. In this second embodiment, however, if no occlusion takes place in the region, it is taken that there exists only a single layer in this region, and thus the processing is uniformly done so that this single layer occurrence is included in the case where the region is divided into a plurality of layers.

Figure 6:
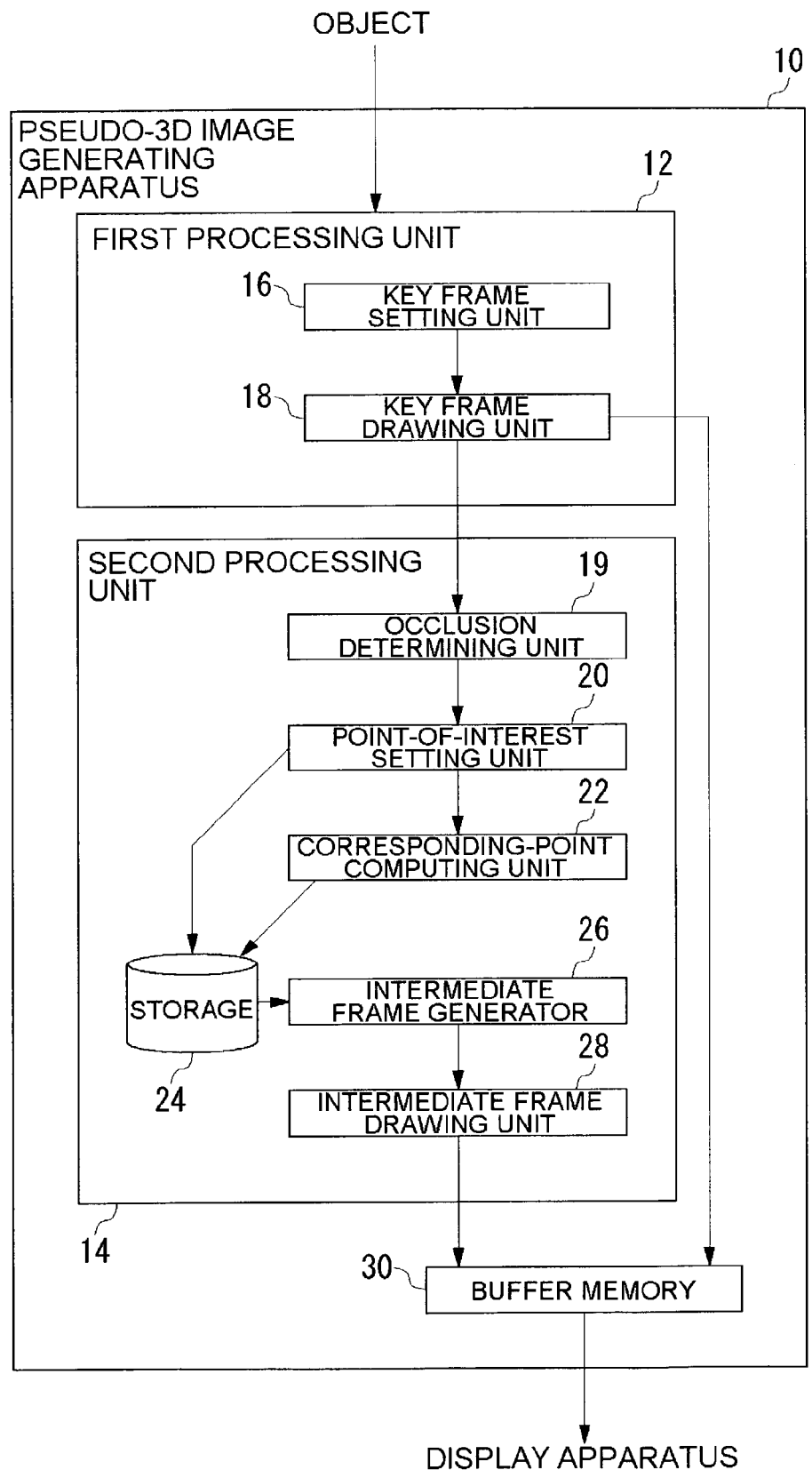
FIG. 6 shows a structure of a pseudo-three-dimensional image generating apparatus according to a second embodiment of the present invention.

FIG. 6 shows a structure of a pseudo-three-dimensional image generating apparatus 10 according to the second embodiment of the present invention. Unlike the first embodiment, the second processing unit includes an occlusion determining unit 19. The occlusion determining unit 19 determines whether there is an occlusion region in a key frame or not. The point-of-interest setting unit 20 and the corresponding-point computing unit 22 divide the occlusion region into layers, set points of interest thereon, and derive the correspondence relations thereof. The intermediate frame generator 26 generates an virtual intermediate frame for each of the layers and generates a final intermediate frame by synthesizing the intermediate frames of the layers.

Figure 7:
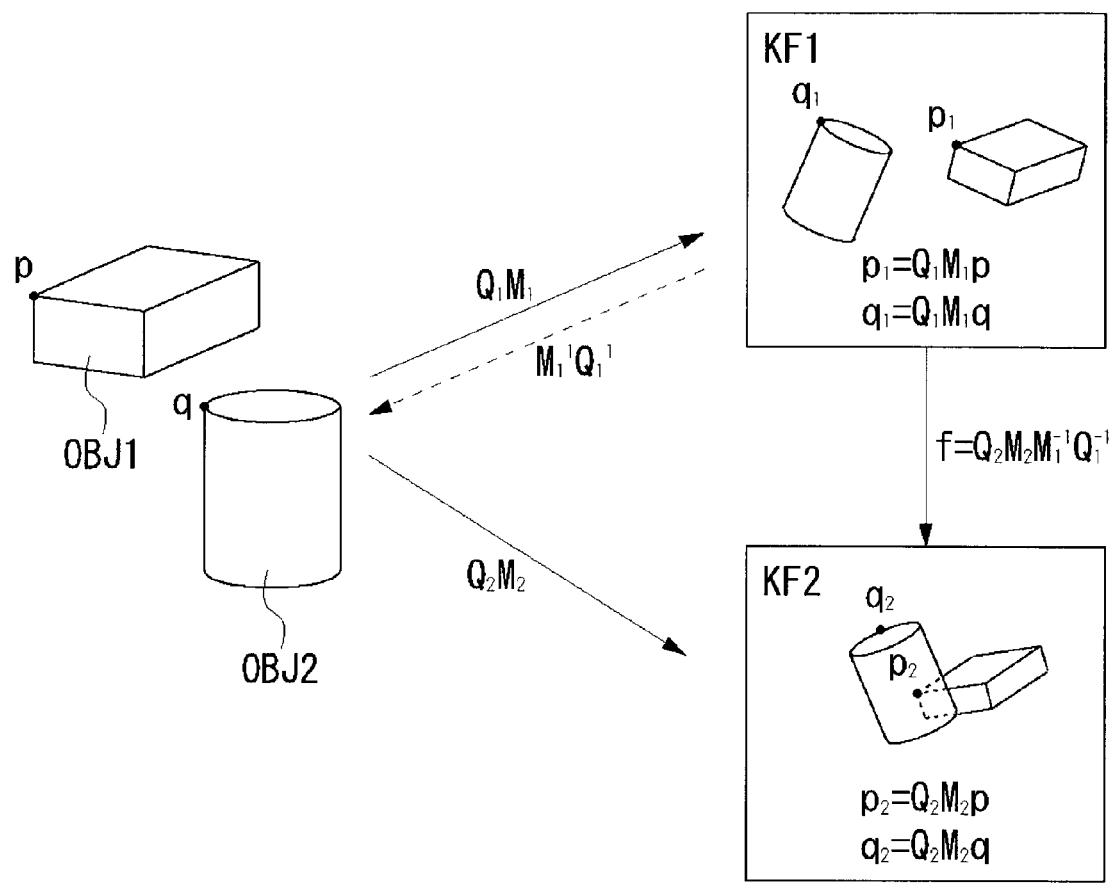
FIG. 7 is a schematic illustration showing operations for drawing two objects on a first key frame and a second key frame.

FIG. 7 is a schematic illustration showing operations for drawing two three-dimensional objects OBJ1 and OBJ2 on a first key frame KF1 and a second key frame KF2. Here, points $p_1$ and $p_2$ are the point of interest and the corresponding point, respectively, relative to the first object OBJ1, whereas points $q_1$ and $q_2$ are the point of interest and the corresponding point, respectively, relative to the second object OBJ2. Moreover, point p is a point on the original first object OBJ1 corresponding to $p_1$ and $p_2$, whereas point q is a point on the original second object OBJ2 corresponding to $q_1$ and $q_2$. The other notation is the same as in the first embodiment.

In this example of FIG. 7, in the second key frame KF2, part of the first object OBJ1 is hidden behind the second object OBJ2 and as a result not visible. Hence, the corresponding point $p_2$ that corresponds to the point of interest $p_1$ on the first object OBJ1 does not exist on the second key frame KF2.

Figure 8:
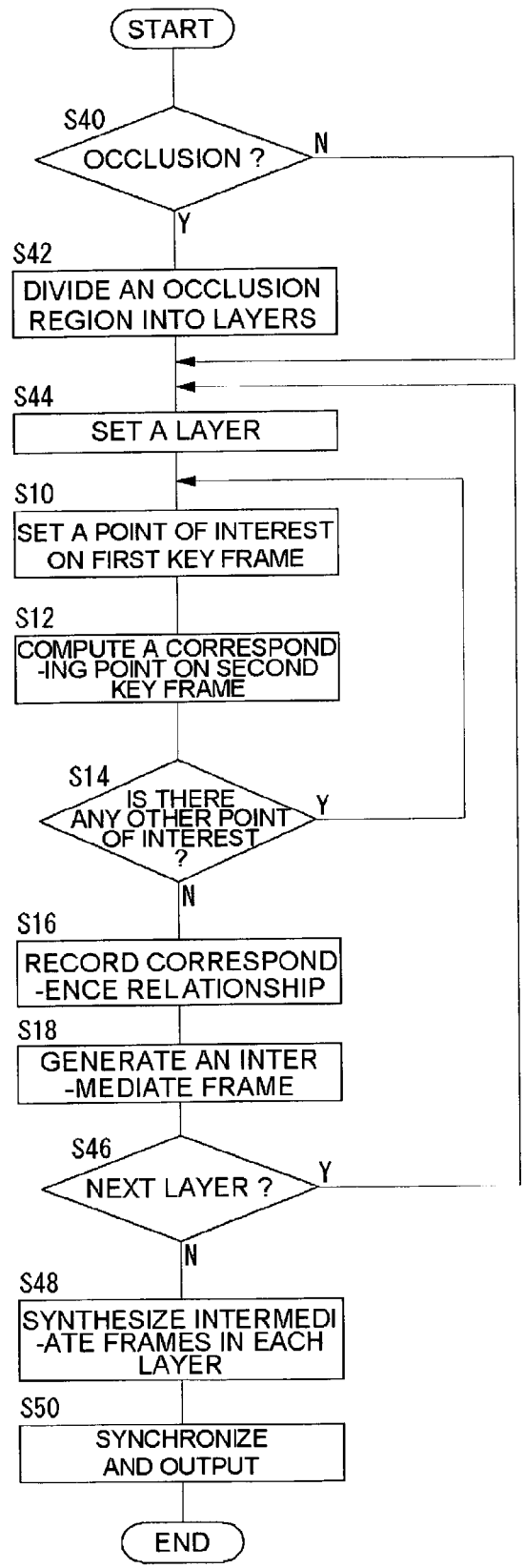
FIG. 8 is a flowchart showing a procedure for generating a pseudo-three-dimensional image according to the second embodiment.

FIG. 8 is a flowchart showing a procedure for generating a pseudo-three-dimensional image according to the second embodiment. The procedure will be explained, using the example shown in FIG. 7. The occlusion determining unit 19 determines whether or not there is any region which is visible in the first key frame KF1 but is not visible in the second key frame KF2 due to the presence of an occlusion (S40). If there exists any occlusion region (Y of S40), the occlusion region is divided into layers in the depth direction (S42). In the example of FIG. 7, there is an occlusion in a part of the first object OBJ1 caused by the second object OBJ2, so that the part is divided into two layers L1 and L2, and the first object OBJ1 is associated with the first layer L1 and the second object OBJ2 is associated with the second layer L2.

Next, layers are set for deriving correspondence relations (S44). First, the first layer L1 is set. At subsequent steps S10 to S18, the same processing as in the first embodiment shown in FIG. 3 are performed for the first layer L1, and the correspondence relations at the first layer are derived, thus generating an intermediate frame at this layer. Then it is determined whether or not there is any layer left whose correspondence relationship is to be checked (S46). Since the second layer is remaining (Y of S46), the process is returned to step S44, and, in a similar manner, the correspondence relation are derived and an intermediate frame is generated for the second layer.

Figure 9:
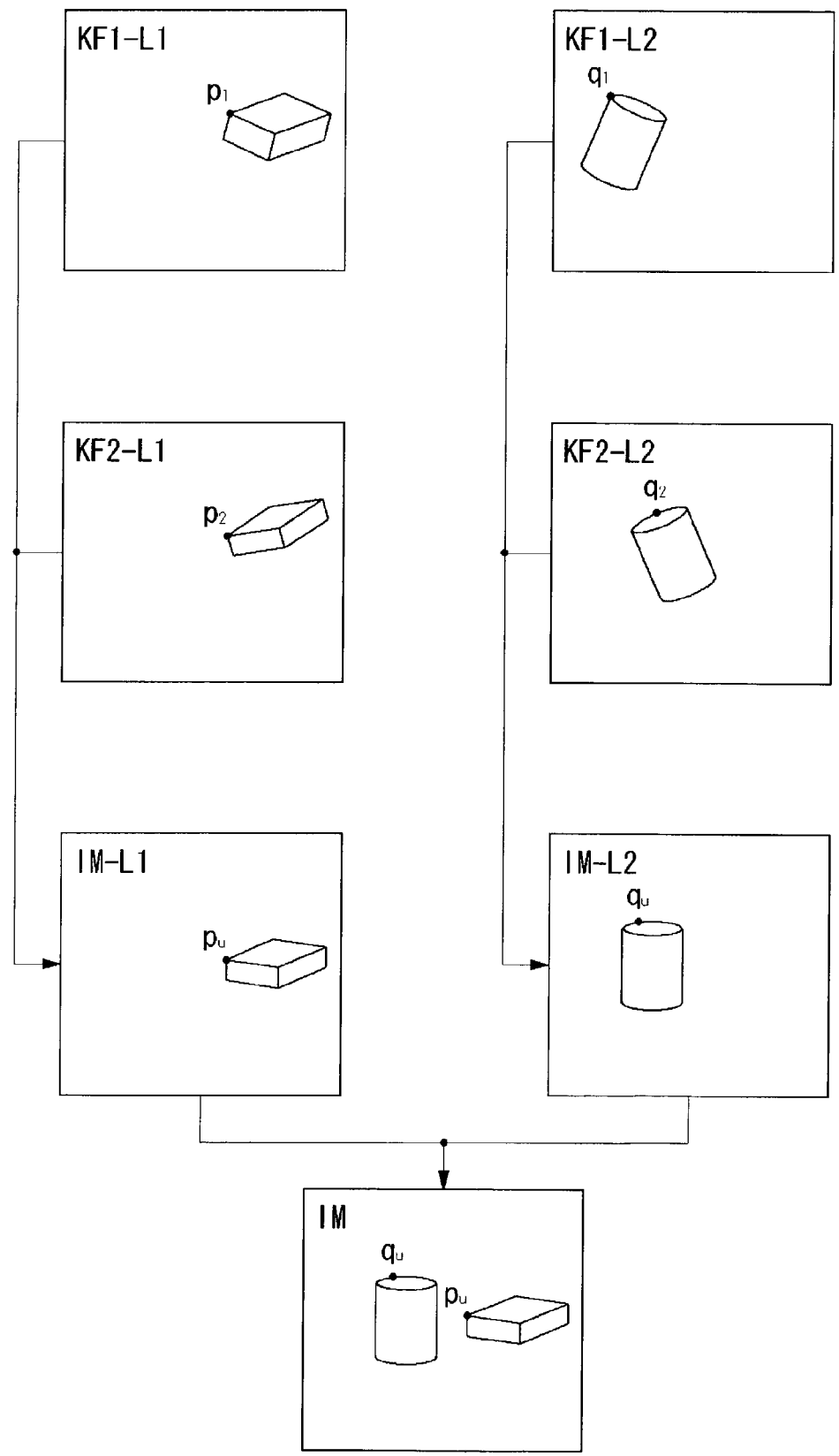
FIG. 9 is schematic illustrations showing a procedure for generating an intermediate frame by the use of a layered structure.

FIG. 9 is schematic illustrations showing a procedure for generating an intermediate frame by the use of a layered structure. In first key frames, divided into a first layer L1 and a second layer L2, KF1-L1 and KF1-L2, the first object OBJ1 and the second object OBJ2 are drawn, respectively. In a similar manner, in second key frames, divided into a first layer L1 and a second layer L2, KF2-L1 and KF2-L2, the first object OBJ1 and the second object OBJ2 are drawn, respectively.

First, for the first layer L1, the point-of-interest setting unit 20 sets a point-of-interest $p_1$ on the first key frame KF1-L1, and the corresponding-point computing unit 22 computes a corresponding point $p_2$ on the second key frame KF2-L1. The intermediate frame generator 26 generates an intermediate frame IM-L1 of the first object OBJ1 by an interpolation computation using the correspondence relationship obtained for the first layer L1. In a similar manner, for the second layer L2, a corresponding point $q_2$ that corresponds to the point-of-interest $q_1$ is computed, and an intermediate frame IM-L2 of the second object OBJ2 is generated based on the correspondence relationship obtained for the second layer L2.

Referring back to FIG. 8, upon completion of processings for all the layers (N of S46), the intermediate frame generator 26 synthesizes the intermediate frames IM-L1 and IM-L2 obtained for the respective layers while taking their overlap in the depth direction into account, and generates a final intermediate frame IM (S48). When synthesizing the images of the first layer L1 and the second layer L2, a synthesis taking an overlap into account is possible, where there is a region with an overlap, by overwriting the image of the first layer L1 by the image of the second layer L2. In a buffer memory 30, rendering data of the synthesized intermediate frame are stored together with rendering data of the key frames, and they are rearranged in the proper order of frames, synchronized at predetermined output timing, and outputted (S50).

Figure 10:
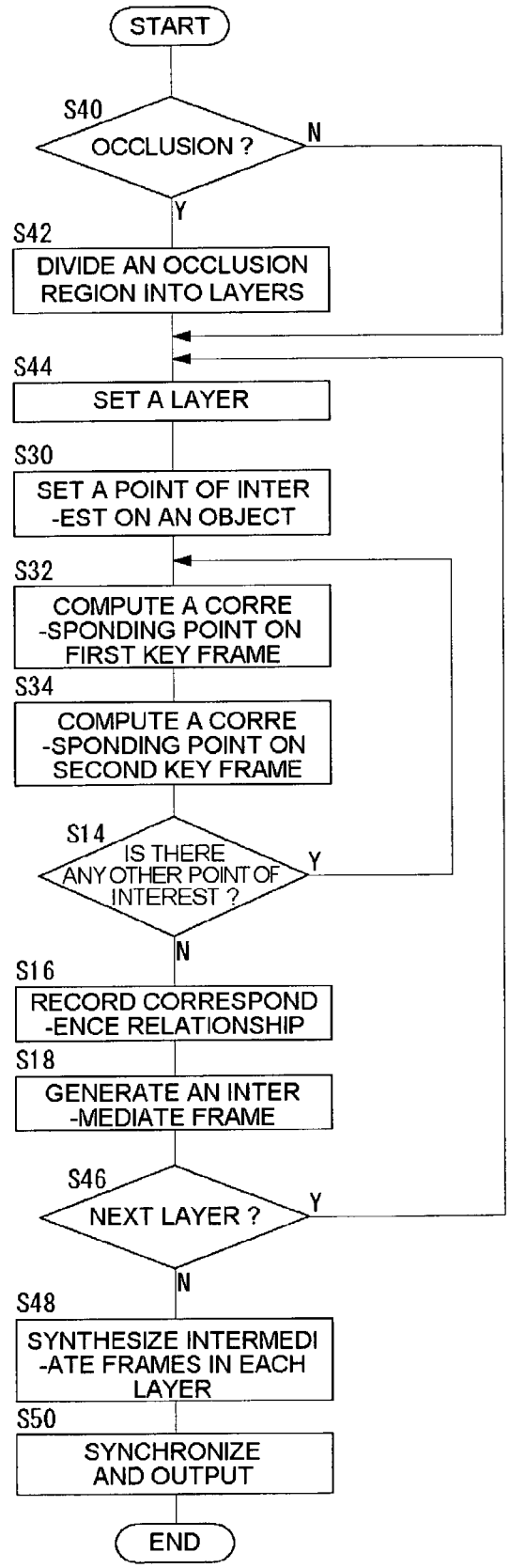
FIG. 10 is a flowchart showing a procedure for generating a pseudo-three-dimensional image from a processing starting point different from that shown in FIG. 8.

FIG. 10 is a flowchart showing a procedure for generating a pseudo-three-dimensional image in which a point on a three-dimensional object is the starting point of a processing. The occlusion determining unit 19 determines whether or not there is any invisible region due to an occlusion in at least one of the frames, namely, the first and the second key frame KF1 and KF2 (S40). If there is any occlusion region, the occlusion region is, in a manner similar to the case of FIG. 8, divided into layers in the depth direction, and the correspondence relation is derived and an intermediate frame is generated fro each of the layers.

For the processing of each layer, the processing procedure designated by the same reference numerals and notation as in the first embodiment shown in FIG. 5 applies. For example, for the second layer L2, a point-of-interest q is set on the second object OBJ2 by the point-of-interest setting unit 20, and a first corresponding point $q_1$ on the first key frame KF1-L2 for the second layer L2 and a second corresponding point $q_2$ on the second key frame KF2-L2 for the second layer L2 are computed by the corresponding-point computing unit 22. The first and second corresponding points $q_1$ and $q_2$ are associated with each other at the second layer L2. Using the correspondence relationship thus obtained, the intermediate frame generator 26 generates an intermediate frame at the second layer L2.

The subsequent processing of synthesizing the intermediate frames at the respective layers (S48) and the processing of synchronization (S50) are the same as those in FIG. 8.

An image that has a layered structure as used in the present embodiment has a data structure in which a plurality of images having different depths in the depth direction are multiplexed, for instance, so that each of the pixels of an image may have a plurality of values depending on the depths. These multiplex data are obtained by successively sampling the surface of a three-dimensional object as seen from a certain viewpoint successively by changing the depth in the depth direction. Thus, when an image is taken out at a layer of a certain depth, the occlusion region becomes visible because, even if there is an invisible region due to an occlusion, an object closer to you is no longer present when the image at a layer deeper than that is taken out. The data structure in which multiplexed are a plurality of images having different depths in the depth direction when seen from a certain viewpoint like this is called an LDI (Layered Depth Image).

In the above explanation, an occlusion region of a key frame is divided into layers when there is any occlusion. However, if the image format has a data structure of a plurality of layered images having different depths in the depth direction, like an LDI, in the first place, then the processing of determining the presence of an occlusion may be omitted and the generation of an intermediate frame for each layer may be started from the layered structure. Moreover, in the present embodiment where an original three-dimensional object model can be utilized, the image of a key frame, even when it does not originally have a structure of an LDI, can be reshaped into an LDI structure as required. In doing so, it is not necessary that all the region of the image be turned into a layered structure, but it suffices that the objects related to the occlusion region only are to have the layered structure.

Some examples of modification based on the present embodiment will be described hereinafter. In the above explanation, the problem of occlusion is taken care of by the use of a layered structure, but there are a number of methods for dealing with occlusion without the use of the layered structure. Where there is an occlusion region, a corresponding point that corresponds to a point of interest is absent in an image. At this time, the corresponding-point computing unit 22 may output an error code indicating the absence of a corresponding point. A warning unit may further be provided whereby the user is instructed at an error to manually perform an interpolation for the point of interest which has no corresponding point.

Moreover, where there is a region which is visible in one of the first key frame and the second key frame but is not visible due to an occlusion in the other thereof, an image processor may further be provided whereby the image of the invisible region due to the occlusion is extracted from the image of the frame which is visible, and the corresponding-point computing unit 22 may compute the correspondence relationship between the key frames by utilizing the extracted image as an virtual image for the occlusion region.

Furthermore, this image processor may generate the image of the invisible region due to the occlusion, from an original three-dimensional object model.

Moreover, the above-mentioned LDI structure may be used as the input format of images on the assumption that data, such as color information of the occlusion region, are already included in the image file. Data on the occlusion region like this can be extracted with relative ease by using a conventional program, such as the ray tracing method or the z-buffer method, for rendering three-dimensional CG. When the user fails to provide data on an occlusion region when providing image data, it is also possible to estimate the data on the occlusion region through the use of information on the key frame adjacent to the key frame which includes the occlusion region and information on the corresponding point thereof.

Figure 11:
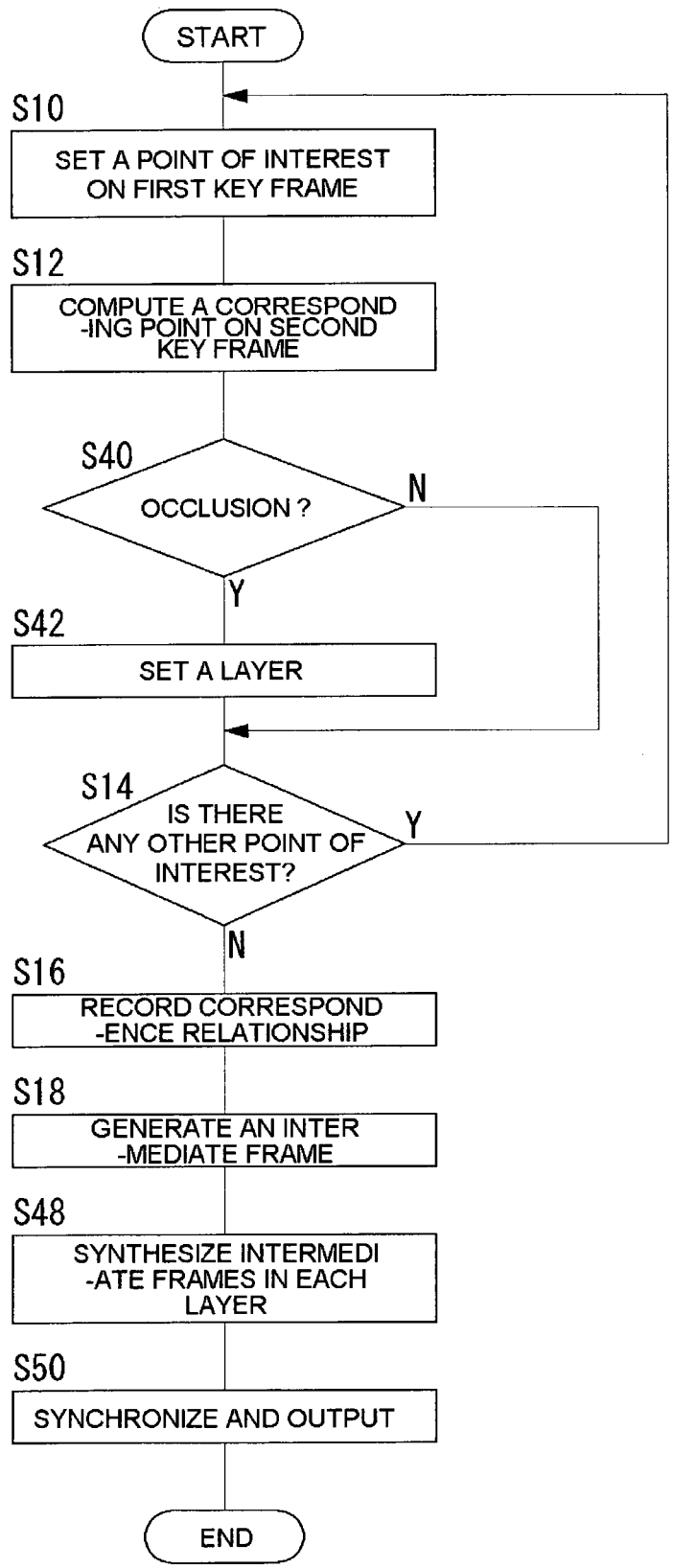
FIG. 11 is a flowchart showing an example of a modified procedure for generating a pseudo-three-dimensional image.

Moreover, even where a layered structure of images is assumed, it is not necessary that the computation of correspondence relationship and the generation of an intermediate frame be performed for each layer after the division into layers, but, instead, the correspondence relationship may be computed by adding layers as a condition at the point when it is found that the correspondence relation cannot be derived from the provided image due to an occlusion. Namely, when the corresponding-point computing unit 22 computes a corresponding point for the point of interest set by the point-of-interest setting unit 20, the occlusion determining unit 19 judges each time whether the corresponding point belongs to the occlusion region or not. When it is judged that the corresponding point belongs to the occlusion region, the corresponding-point computing unit 22 assigns a layered structure to the correspondence relationship and obtains a correspondence relationship under a constraint that both the point of interest and the corresponding point belong to the same layer. The flowchart of this example of modification is shown in FIG. 11.

Different from the case shown in FIG. 8, the occlusion determining unit 19, in the process where the corresponding-point computing unit 22 computes a corresponding point in the second key frame KF2, judges whether the corresponding point belongs to the occlusion region in the second key frame KF2 or not (S40). When it is judged that the corresponding point belongs to the occlusion region (Y of S40), the corresponding-point computing unit 22 sets layer information for the correspondence relationship (S42). For example, in the case where the point-of-interest setting unit 20 sets a point-of-interest $p_1$ in the first key frame KF1 and the corresponding-point computing unit 22 computes a corresponding point $p_2$ on the second key frame KF2, it is determined by the occlusion determining unit 19 that the corresponding point $p_2$ belongs to the occlusion region in the second key frame KF2, and the layer information indicating that the point-of-interest $p_1$ and the corresponding point $p_2$ belong to the second layer L2 is recorded together with the correspondence relationship of these points. The intermediate frame generator 26, when generating an intermediate frame by an interpolation computation from the correspondence relationship, generates an intermediate frame for each layer using this layer information.

A similar modification may be possible with the procedure for generating a pseudo-three-dimensional image in which a point on the three-dimensional object serves as the starting point of processing as shown in FIG. 10. In a process where the corresponding-point computing unit 22 computes a first corresponding point in a first key frame and a second corresponding point in a second key frame, the occlusion determining unit 19 determines whether the first and the second corresponding points belong to the occlusion region in their respective key frames. Where at least one of the corresponding points belongs to the occlusion region, the corresponding-point computing unit 22 sets layer information for the correspondence relation of the first and the second corresponding points.

In the second embodiment, a layer structure of images is utilized in processing the problem of occlusion, and it does not necessarily require as a precondition a data structure hierarchized according to the physical distance in the depth direction. A layer structure of images is acceptable so long as the objects related to the region where an occlusion occurs are hierarchized necessarily and sufficiently to eliminate the occlusion. By limiting the division into layers to the region where occlusion occurs, the cost for computing the correspondence relationship can be suppressed to a low level, and the amount of information necessary to store the correspondence relationship can be reduced.

In the above description, the operation $M_i$ is performed on a three-dimensional object, but the $M_i$, as a three-dimensional coordinate transformation operator, may be applicable not only in object units but also in pixel units of an image or in vertex units of a polygon.

The present invention has been described based on embodiments. According to these embodiments, key frames only are rendered and intermediate frames can be generated with relative ease by interpolation computation using the correspondence relationship between key frames, so that the rendering time can be reduced markedly when compared with a general rendering technique for CG motion pictures where all the frames are rendered. For example, if a key frame is placed at a rate of one for every five frames, then the rendering time may be made nearly five times shorter, thus enabling high-speed rendering of moving pictures.

Moreover, according to these embodiments, intermediate frames are generated from the correspondence relationship between key frames only, which has nothing to do with rendering techniques. Thus, the process may be applied to the ray tracing method, radiosity method, photon mapping method and other methods, and can be implemented into a variety of rendering software.

Moreover, according to these embodiments, intermediate frames are generated at the time of drawing, so that the intermediate frames can be excluded and the CG motion pictures can be recorded in a reduced amount of data on the key frames and the correspondence relationship, thus making efficient compression of CG motion pictures possible. Moreover, according to the second embodiment, information on the layered structure is also recorded and the correspondence relationship taking occlusion into account is stored. Thus, moving pictures generated from the compressed CG motion pictures are free from errors due to occlusion, so that high-quality images are displayed.

As has been described, the present invention can be utilized for method, apparatus, system and program for generating pseudo-three-dimensional images where a three-dimensional object mode is drawn.

Although the present invention has been described by way of exemplary embodiments, it should be understood that many changes and substitutions may be made by those skilled in the art without departing from the scope of the present invention which is defined by the appended claims.

What is claimed is:

1. A pseudo-three-dimensional image generating method, the method including:
   assigning a point of interest to a first CG image that contains a three-dimensional object model; and computing a corresponding point that corresponds to the point of interest in a second CG image that contains the three-dimensional object model,
wherein said computing derives the corresponding point in such a manner that image coordinates of the point of interest serve as processing starting information and wherein said commuting is such that the three-dimensional object model is divided into layers according to depth, and the corresponding point that corresponds to the point of interest is computed for each of the layers.

2. A method according to claim 1, wherein, when an operation by which the three-dimensional object model is operated inside a three-dimensional space in order to obtain an i-th CG image (i being a natural number) is denoted by $M_i$, an operation to obtain the i-th CG image by projecting the three-dimensional object model onto a two-dimensional plane after the operation $M_i$ has been performed is denoted by $Q_i$, the point of interest is denoted by p and the corresponding point is denoted by p', said computing is such that $$p'=Q_2 M_2 M_1^{-1} Q_1^{-1} p$$

is calculated so as to derive the point of interest.

3. A method according to claim 2, wherein said computing includes determining occlusion, and if it is determined that the corresponding point is invisible in the second CG image due to occlusion, outputting data indicating that there does not exist a point on the second CG image to be corresponded to the point of interest.

4. A method according to claim 2, wherein said computing includes determining occlusion, and if it is determined that the corresponding point is invisible in the second CG image due to occlusion, the corresponding point is corresponded to the point of interest on the assumption that the corresponding point virtually exists on the second CG image.

5. A method according to claim 2, further including determining occlusion in the second CG image and the corresponding point that corresponds to the point of interest is computed for each of the layers if it is determined that there exists a visible region in the first CG image while there exists an invisible region in the second CG image due to occlusion.

6. A method according to claim 2, wherein the first CG image and the second CG image are respectively constituted by pixels having depth information or an aggregate thereof, and three dimension information is maintained by said computing of $$p'=Q_2 M_2 M_1^{-1} Q_1^{-1} p.$$

7. A method according to claim 1, wherein said computing includes determining occlusion, and if it is determined that the corresponding point is invisible in the second CG image due to occlusion, outputting data indicating that there does not exist a point on the second CG image to be corresponded to the point of interest.

8. A method according to claim 1, wherein said computing includes determining occlusion, and if it is determined that the corresponding point is invisible in the second CG image due to occlusion, the corresponding point is corresponded to the point of interest on the assumption that the corresponding point virtually exists on the second CG image.

9. A method according to claim 1, further including generating an intermediate image of the first CG image and the second CG image by interpolating image positions of the point of interest and the corresponding point.

10. A method according to claim 1, further including determining occlusion in the second CG image and the corresponding point that corresponds to the point of interest is computed for each of the layers if it is determined that there exists a visible region in the first CG image while there exists an invisible region in the second CG image due to occlusion.

11. A method according to claim 10, further including generating an intermediate image of the first CG image and the second CG image for each of the layers by interpolating image positions of the point of interest and the corresponding point, and synthesizing the intermediate image generated for each of the layers by taking overlap in a depth direction into account.

12. A method according to claim 1, further including generating an intermediate image of the first CG image and the second CG image for each of the layers by interpolating image positions of the point of interest and the corresponding point, and synthesizing the intermediate image generated for each of the layers by taking overlap in a depth direction into account.

13. A pseudo-three-dimensional image generating method, the method including:
assigning a point of interest to a three-dimensional object model;
computing a first corresponding point which corresponds to the point of interest in a first CG image that contains the three-dimensional object model;
computing a second corresponding point which corresponds to the point of interest in a second CG image that contains the three-dimensional object model; and
recording the first corresponding point and the second corresponding point in an associated manner,
wherein said computing a first corresponding point and said computing a second corresponding point are such that the three-dimensional object model is divided into layers according to depth, and the first corresponding point and the second corresponding point that correspond to the point of interest are respectively computed layer by layer.

14. A method according to claim 13, wherein, when an operation by which the three-dimensional object model is operated inside a three-dimensional space in order to obtain an i-th CG image (i being a natural number) is denoted by $M_i$, an operation to obtain the i-th CG image by projecting the three-dimensional object model onto a two-dimensional plane after the operation $M_i$ has been performed is denoted by $Q_i$, the point of interest is denoted by p and the corresponding point is denoted by p', said computing a first corresponding point is such that $$p_1=Q_1 M_1 p$$

is calculated, and said computing a second corresponding point is such that $$p_2=Q_2 M_2 p$$

is calculated, and said recording is such that at least a pair of data item, $(p_1, p_2)$, are recorded.

15. A method according to claim 14, further including generating an intermediate image of the first CG image and the second CG image by interpolating image positions of the first corresponding point and the second corresponding point.

16. A method according to claim 14, further including judging the presence of occlusion in the first and second CG image and the first corresponding point and the second corresponding point that correspond to the point of interest are computed layer by layer if it is judged that there exists an invisible region in at least one of the first and second CG images due to occlusion.

17. A method according to claim 13, further including generating an intermediate image of the first CG image and the second CG image by interpolating image positions of the first corresponding point and the second corresponding point.

18. A method according to claim 13, further including judging the presence of occlusion in the first and second CG image and the first corresponding point and the second corresponding point that correspond to the point of interest are computed layer by layer if it is judged that there exists an invisible region in at least one of the first and second CG images due to occlusion.

19. A method according to claim 18, further including generating an intermediate image of the first CG image and the second CG image for each of the layers by interpolating image positions of the first corresponding point and the second corresponding point, and synthesizing the intermediate image generated for each of the layers by taking overlap in a depth direction into account.

20. A method according to claim 13, further including generating an intermediate image of the first CG image and the second CG image for each of the layers by interpolating image positions of the first corresponding point and the second corresponding point, and synthesizing the intermediate image generated for each of the layers by taking overlap in a depth direction into account.

21. A pseudo-three-dimensional image generating method, the method including:
assigning a point of interest to a first CG image that contains a three-dimensional object model; and
computing a corresponding point that corresponds to the point of interest in a second CG image that contains the three-dimensional object model,
wherein said computing is such that an image coordinate of the point of interest is utilized as processing starting information, the first CG image and the second CG image are respectively divided into layers according to depth, and the corresponding point is derived by taking the layer, to which the point of interest and the corresponding point belong, into account as a condition.

22. A method according to claim 21, wherein said computing is such that the corresponding point that corresponds to the point of interest is computed on condition that both the point of interest and the corresponding point belong to a same layer.

23. A method according to claim 22, wherein, when an operation by which the three-dimensional object model is operated inside a three-dimensional space in order to obtain an i-th CG image (i being a natural number) is denoted by $M_i$, an operation to obtain the i-th CG image by projecting the three-dimensional object model onto a two-dimensional plane after the operation $M_I$ has been performed is denoted by $Q_I$, the point of interest is denoted by p and the corresponding point is denoted by p', said computing is such that $$p'=Q_2M_2M_1^{-1}Q_1^{-1}p$$

is calculated so as to derive the point of interest.

24. A method according to claim 21, wherein, when an operation by which the three-dimensional object model is operated inside a three-dimensional space in order to obtain an i-th CG image (i being a natural number) is denoted by $M_I$, an operation to obtain the i-th CG image by projecting the three-dimensional object model onto a two-dimensional plane after the operation $M_i$ has been performed is denoted by $Q_i$, the point of interest is denoted by p and the corresponding point is denoted by p', said computing is such that $$p'=Q_2M_2M_1^{-1}Q_1^{-1}p$$

is calculated so as to derive the point of interest.

25. A method according to claim 21, further including generating an intermediate image of the first CG image and the second CG image by interpolating image positions of the point of interest and the corresponding point.

26. A pseudo-three-dimensional image generating method, the method including:
assigning a point of interest to an object model;
computing a first corresponding point that corresponds to the point of interest in a first CG image that contains the three-dimensional object model;
computing a second corresponding point that corresponds to the point of interest in a second CG image that contains the three-dimensional object model; and
recording the first corresponding point and the second corresponding point in an associated manner,
wherein said recording in an associated manner is such that the first CG image and the second CG image are respectively divided into layers according to depth, and the first corresponding point is associated with the second corresponding point based on a condition of a layer or layers that the first corresponding point and the second corresponding point belong to.

27. A method according to claim 26, wherein said recording is such that the first corresponding point and the second corresponding point are recorded in an associated manner on condition that both the first corresponding point and the second corresponding point belong to a same layer.

28. A method according to claim 27, wherein, when an operation by which the three-dimensional object model is operated inside a three-dimensional space in order to obtain an i-th CG image (i being a natural number) is denoted by $M_i$, an operation to obtain the i-th CG image by projecting the three-dimensional object model onto a two-dimensional plane after the operation $M_i$ has been performed is denoted by $Q_i$, the point of interest is denoted by p and the corresponding point is denoted by p', said computing a first corresponding point is such that $$p_1=Q_1M_1p$$

is calculated, said computing a second corresponding point is such that $p_2=Q_2M_2p$, and said recording is such that at least a pair of data item, $(p_1, p_2)$, are recorded.

29. A method according to claim 26, wherein, when an operation by which the three-dimensional object model is operated inside a three-dimensional space in order to obtain an i-th CG image (i being a natural number) is denoted by $M_i$, an operation to obtain the i-th CG image by projecting the three-dimensional object model onto a two-dimensional plane after the operation $M_I$ has been performed is denoted by $Q_i$, the point of interest is denoted by p and the corresponding point is denoted by p', said computing a first corresponding point is such that $$p_1=Q_1M_1p$$

is calculated, said computing a second corresponding point is such that $p_2=Q_2M_2p$, and said recording is such that at least a pair of data item, $(p_1, p_2)$, are recorded.

30. A method according to claim 26, further including generating an intermediate image of the first CG image and the second CG image by interpolating image positions of the first corresponding point and the second corresponding point.

31. A pseudo-three-dimensional image generating apparatus which renders, by CG, moving pictures that contain a three-dimensional object model, the apparatus comprising:
- a first processing unit which draws key frames selected from a plurality of image frames that constitute the moving pictures, by using a direct method that copes with description of the three-dimensional object model; and
- a second processing unit which generates intermediate images by interpolating the key frames, wherein said second processing unit comprises:
  - a point-of-interest setting unit which assigns a point of interest to a first key frame that contains the three-dimensional object model; and
  - a corresponding-point computing unit which computes a corresponding point that corresponds to the point of interest in a second key frame that contains the three-dimensional object model, in such a manner that image coordinates of the point of interest serve as processing starting information, and
  - wherein the intermediate frame is generated based on a positional relation between the point of interest and the corresponding point and wherein said corresponding-point computing unit divides the three-dimensional object model into layers according to depth, and computes the corresponding point that corresponds to the point of interest layer by layer.

32. Apparatus according to claim 31, wherein said second processing unit further includes an occlusion determining unit which judges the presence of occlusion in the second key frame, and computes the corresponding point that corresponds to the point of interest layer by layer if it is determined that there exists a visible region in the first key frame while there exists an invisible region in the second key frame due to occlusion.

33. Apparatus according to claim 32, wherein said second processing unit generates the intermediate frame, for each of the layers, based on a positional relation between the point of interest and the corresponding point, and synthesizes the intermediate frame generated for each of the layers by taking overlap in a depth direction into account.

34. Apparatus according to claim 31, wherein said second processing unit generates the intermediate frame, for each of the layers, based on a positional relation between the point of interest and the corresponding point, and synthesizes the intermediate frame generated for each of the layers by taking overlap in a depth direction into account.

35. Apparatus according to claim 31, wherein said corresponding-point computing unit computes a first corresponding point that corresponds to the point of interest in a first key frame that contains the three-dimensional object model, and computes a second corresponding point that corresponds to the point of interest in a second key frame that contains the three-dimensional object model; and said second processing unit further comprises:
- a recording unit which records the first corresponding point and the second corresponding point in an associated manner,
- wherein said second processing unit generates the intermediate frame based on a positional relation between the first corresponding point and the second corresponding point.

36. Apparatus according to claim 35, wherein said corresponding-point computing unit computes the first corresponding point and the second corresponding point that correspond to the point of interest layer by layer if it is determined that there exists a visible region in the first key frame while there exists an invisible region in the second key frame due to occlusion.

37. Apparatus according to claim 36, wherein said second processing unit generates the intermediate frame, for each of the layers, based on a positional relation between the first corresponding point and the second corresponding point, and synthesizes the intermediate frame generated for each of the layers by taking overlap in a depth direction into account.

38. Apparatus according to claim 35, further including an occlusion determining unit which judges the presence of occlusion in the first and second key frames, wherein said corresponding-point computing unit computes the first corresponding point and the second corresponding point that correspond to the point of interest layer by layer if it is judged that there exists an invisible region in at least one image frame of the first and second key frames due to occlusion.

39. Apparatus according to claim 38, wherein said second processing unit generates the intermediate frame, for each of the layers, based on a positional relation between the first corresponding point and the second corresponding point, and synthesizes the intermediate frame generated for each of the layers by taking overlap in a depth direction into account.

* * * * *